United States Patent Office 3,128,133
Patented Apr. 7, 1964

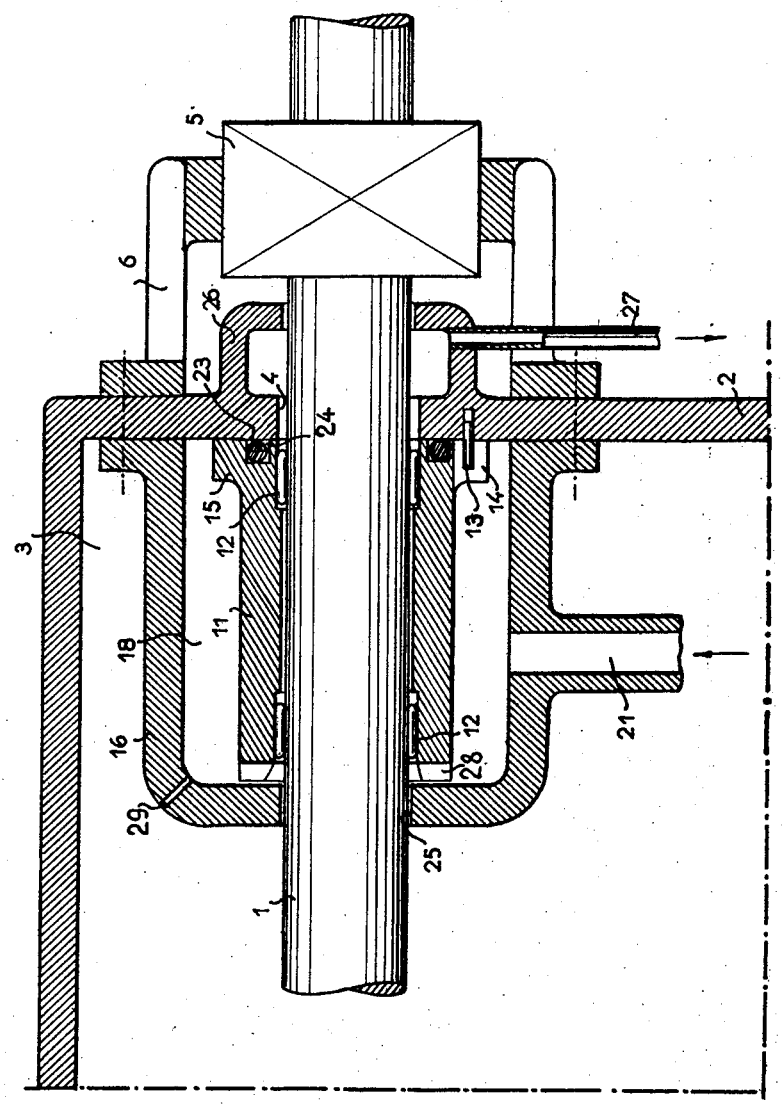

3,128,133
SHAFT SEAL
Pierre Audemar, Mulhouse, France, assignor to Societe Alsacienne de Constructions Mecaniques, Mulhouse, Haut-Rhin, France
Filed Sept. 5, 1961, Ser. No. 135,984
Claims priority, application France June 26, 1961
10 Claims. (Cl. 308—36.3)

This invention relates to improved means for mounting a shaft through an aperture in a wall across which a fluid pressure differential is present, so as to permit movement, e.g. rotation, of the shaft relative to the wall while providing an effective seal against said pressure differential.

In the past such shaft sealing arrangements have usually required the provision of very close tolerances between the outer diameter of the shaft and the diameter of the wall aperture through which the shaft extends, and/or have involved the use of labyrinth seals which are somewhat complicated and introduce other difficulties. It is an object of this invention to provide such shaft sealing means which will be both simple and highly effective.

One chief difficulty in past shaft sealing arrangements has been that in addition to simultaneously with the requirement of close dimensional tolerances between the shaft diameter and the diameter of the aperture providing a passage for the shaft, there was the further requirement of having to support the shaft for rotational or/and sliding movement through such aperture in highly accurately centered relationship therewith. While it is a comparatively simple matter with present-day machining techniques to provide a bore that will be a very close and snug fit around a shaft, it is considerably more difficult to support the shaft in precisely centered relationship with such a bore and prevent any misalignment of the shaft bearing means or the shaft itself. For this reason a simple yet effective shaft seal of this kind has been practically impossible to achieve. It is an object of the invention entirely to eliminate, in a shaft seal, the requirement of a percise, radially-fixed, centered relationship between the shaft supporting means and the bore snugly fitted around the shaft. Another and related object is to achieve in a simple and effective manner a predetermined constant flow rate of sealing fluid through a movable shaft seal making it possible to maintain permanently a desired pressure differential across the seal. The invention may further achieve the object of recovering such sealing fluid. In accordance with another object, the sealing fluid may be the same as or different from the fluid in which a pressure differential is established across the wall.

According to an important aspect of the invention the shaft is made to extend freely through a relatively wide aperture in the wall across which a fluid pressure differential is to be maintained, and is supported for the desired movement—rotation and/or axial displacement—within said aperture by any suitable bearing means. A tubular sleeve member bored to an inner diameter accurately corresponding to the shaft diameter is snugly fitted around the shaft on the high-pressure side of the wall and has an end face sealingly engaging the wall surface around the aperture. Thus the sleeve member will be pressed by said higher fluid pressure into tight sealing engagement with the wall while remaining centered around the shaft, without it being necessary to take care of the centered relationship between the shaft supporting bearing means and the bore in said member.

An exemplary embodiment of the invention will now be described for purposes of illustration but not of limitation with reference to the accompanying drawing, which is a simplified view mainly in longitudinal section on a plane parallel to the shaft axis, of an improved shaft sealing arrangement according to the invention.

The drawing shows part of an enclosure 3 defined by a wall 2 and containing, in the illustrative embodiment, gas under super atmospheric pressure. A shaft 1 extends through an aperture 4 formed in the wall 2 and substantially wider than the diameter of the shaft, as shown. The shaft 1 is supported for rotation by suitable bearing means, one such bearing being schematically shown at 5 as being supported from arms 6 projecting from wall 2 outside the enclosure.

In accordance with the invention a tubular sleeve member 11 is formed over a major portion of its length intermediate its end portions with a bore of a diameter which is accurately predetermined with respect to the diameter of shaft 1 so as to provide a sung rotatable fit therebetween. The sleeve 11 is supported for relative rotation around the shaft 1 through antifriction means such as needle bearings 12 inserted in enlarged end portions of the sleeve and engaging the shaft periphery. The sleeve member has an end flange 15 having a face engaging the inner surface of wall 2 around the aperture 4 and formed with an annular groove 23 in which a ring seal 24 is fitted.

In the selected embodiment there is used a sealing fluid which is different from the pressure fluid contained in enclosure 3, and accordingly the sleeve member 11 is surrounded by a housing member 16 having a flanged open end secured, e.g. bolted, to the wall 2 and formed in its other end with an aperture 25 through which the shaft 1 freely extends, the aperture 25 similarly to aperture 4 in the wall being formed with a diameter substantially larger than the shaft diameter. Sealing fluid, preferably a liquid such as oil, is continually pumped into the inlet chamber 18 defined in housing 16 through an inlet connection 21 so as to maintain in the chamber 18 a pressure somewhat higher, preferably only slightly higher, than the gas pressure in enclosure 3. Formed on the outer side of wall 2 around the shaft aperture 4 is a housing 26 having another aperture, as shown, through which the shaft 1 freely extends and defining around the shaft an outlet chamber with which an outlet line 27 is connected providing a return connection for the oil pumping circuit.

Sleeve 11 is prevented from rotation with shaft 1 by any suitable means, such as a pin 13 projecting from wall 2 into a slot 14 formed in flange 15, whereby the pin 13 while preventing rotation of sleeve 11 relative to wall 2 does not fix the radial position of the sleeve relative to the wall. Axial displacement of sleeve 11 within housing 16 is restricted to a small clearance value through abutment of stops or castellations such as 28 on the end wall of the sleeve 11, with the inner end wall surface of housing member 16. A vent 29 is preferably formed through the wall of housing 16 near the top thereof.

In operation, oil is pumped through inlet 21 into housing chamber 18 at a rate just sufficient to maintain therein a slight excess pressure over the gas pressure in enclosure 3. An amount of the oil passes through vent 29 and aperture 25 into the enclosure, the position of vent 29 ensuring that no air will be entrapped in chamber 18. Such oil flowing into enclosure 3 may be recovered if desired through any suitable means. Another part of the oil pumped into chamber 18 seeps through the radial clearance space present between shaft 1 and the bore in sleeve 11, and through aperture 4 in wall 2 into outlet chamber 26 which it may enter e.g. substantially at atmospheric pressure and is thence recycled through outlet line 27.

The excess pressure in chamber 18 even though it may be quite low is sufficient to press the sleeve member 11 rightward into sealing engagement between the end face of flange 15 and the surface of the wall. It will be noted that since the sleeve 11 is essentially stationary with respect to the wall a simple seal ring 23 is entirely adequate to provide a tight seal at this location.

At the same time the sleeve member 11 being independent of wall 2 is free to effect small shifting motions transversely to shaft 1 with respect to wall 2, as may be required to take up any slight, unavoidable misalignment or eccentricity that may be present in the shaft bearing means and or the shaft 1 itself, without impairing the seal. This is a principal advantage of the invention, it being evident that if the accurately machined bore fitting around the shaft 1, instead of being formed in a sleeve member separate from the wall, as herein, were to be formed in said wall itself as in many earlier forms of shaft seals, or in a part rigidly connected with the wall, there would have to be achieved an impracticably high degree of coaxial alignment between such bore and the shaft bearing means in order to maintain an effective seal. The invention therefore, in that it eliminates this requirement by the provision of the separately bored sleeve member 11, makes it possible to obtain a more perfect seal than heretofore attainable at lower manufacturing costs and to maintain such a seal for long periods of time.

The degree of seal in an arrangement of the type here contemplated is expressible as the constant rate of flow of sealing fluid, e.g. oil, that has to be pumped through the seal under steady conditions in order to maintain the requisite pressure differential across the wall. This flow rate depends on a plurality of factors including the pressure to be maintained, the viscosity of the sealing liquid, the radial clearance between shaft 1 and sleeve 11 and the length of the bore. In one practical embodiment of the invention, there was provided a radial clearance of 0.04 mm. between the shaft 1 and the bore in sleeve 11, over a length of 130 mm., the shaft diameter was 130 mm., and oil of viscosity 2 degrees Engler was pumped at a constant rate of about 0.5 liter/second.

It will be evident that in many applications it will be feasible to do without any auxiliary liquid for sealing and lubricating purposes, this role being assumed by the fluid, liquid or gaseous, present on the high-pressure side of the seal i.e. the fluid in the enclosure 3 of the drawing; in such cases the housings shown at 16 and 26 as well as the inlet and outlet lines shown and the pumping means, may all be omitted.

Whereas the shaft 1 of the example was described as being mounted for rotation, the sealing arrangement of the invention is equally applicable to cases where the movable shaft is mounted for axial displacement in the wall, or for both rotation and axial displacement. Thus in the case of an axially reciprocatory shaft 1, the needle bearings such as 12 may be replaced by balls movable in axial grooves formed in the sleeve and/or shaft surface. Various other modifications may be conceived.

What I claim is:

1. The combination comprising a wall having one side exposed to a higher fluid pressure than its opposite side, a shaft freely extending through an aperture in said wall and supported for movement relative thereto, a tubular sleeve member snugly fitted around the shaft on the higher-pressure side of the wall and supported substantially solely by the shaft, said member having an end face sealingly engageable with the wall surface around said aperture, whereby said member will be pressed by said higher fluid pressure into sealing engagement with the wall surface while remaining centered around the shaft and means for locking said member against rotation relative to said wall surface.

2. The combination comprising a wall having one side exposed to a higher fluid pressure than its opposite side, a shaft freely extending through an aperture in the wall and supported for rotation relative thereto, a tubular sleeve member snugly rotatably fitted around the shaft on the higher-pressure side of the wall and supported substantially solely by the shaft, means preventing rotation of the member by the shaft, said member having an end face sealingly engageable with the wall surface around said aperture, whereby said member will be pressed by said higher fluid pressure into sealing engagement with the wall while remaining centered relatively to the shaft regardless of minor misalignment effects between the shaft and wall.

3. The combination claimed in claim 2, wherein said rotation-preventing means comprise a pin and slot connection between said member end face and wall surface.

4. The combination claimed in claim 2, including bearing means for supporting said shaft and means supporting the bearing means from the lower-pressure side of the wall.

5. The combination claimed in claim 1, including an annular seal interposed between the end face of said member and said wall surface.

6. The combination claimed in claim 1, including antifriction bearing means interposed between the shaft and sleeve member.

7. The combination comprising a wall having one side exposed to a higher fluid pressure than its opposite side; a shaft freely extending through an aperture in said wall and supported for movement relative thereto; a tubular sleeve member snugly fitted around the shaft on the higher-pressure side of the wall and supported solely from the shaft for relative movement with respect thereto; said member having an end face sealingly engageable with the wall surface around the aperture; housing means cooperating with said higher-pressure wall side to define an inlet chamber surrounding said member and having an aperture therein through which said shaft freely extends; fluid inlet means connected with said inlet chamber and means for delivering a sealing fluid through said inlet to maintain within said inlet chamber a sealing fluid pressure somewhat higher than said fluid pressure to which said one side of the wall is exposed externally of the housing member.

8. The combination claimed in claim 7 further comprising means defining an outlet chamber on the other side of the wall around said aperture, and outlet means connected with the outlet chamber for collecting and recycling the sealing fluid seeping from said inlet chamber through said tubular member and said wall aperture into said outlet chamber.

9. The combination claimed in claim 7 wherein said higher fluid pressure to which the one side of the wall is exposed is a gas pressure and wherein the sealing fluid is a liquid.

10. The combination claimed in claim 9, including a vent opening formed through a wall of said housing means adjacent the top thereof for communication with said pressure gas.

References Cited in the file of this patent

UNITED STATES PATENTS

| | | |
|---|---|---|
| 2,237,494 | McCormack | Apr. 8, 1941 |
| 2,268,218 | Lum | Dec. 30, 1941 |
| 2,772,103 | Strub | Nov. 27, 1956 |